US012750314B2

(12) United States Patent
Duan et al.

(10) Patent No.: US 12,750,314 B2

(45) Date of Patent: Sep. 29, 2026

(54) NETWORK ADDRESS TRANSLATION (NAT) HOLE PUNCHING OVER SOFTWARE-DEFINED WIDE AREA NETWORKING (SD-WAN) FOR LINK QUALITY SELECTION OF VIRTUAL PRIVATE NETWORKING (VPN) TUNNELS

(71) Applicant: Fortinet, Inc., Sunnyvale, CA (US)

(72) Inventors: Shangwei Duan, Vancouver (CA); Wang Xi, Vancouver (CA); Yong lin Han, Surrey (CA); Pin Yi Kuo, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 125 days.

(21) Appl. No.: 19/003,976

(22) Filed: Dec. 27, 2024

(65) Prior Publication Data

US 2025/0150393 A1 May 8, 2025

Related U.S. Application Data

(63) Continuation-in-part of application No. 17/566,801, filed on Dec. 31, 2021, now Pat. No. 12,381,777.

(51) Int. Cl.

*H04L 45/76* (2022.01)
*H04L 12/46* (2006.01)

(Continued)

(52) U.S. Cl.

CPC .......... *H04L 45/76* (2022.05); *H04L 12/4633* (2013.01); *H04L 41/0806* (2013.01); *H04L 45/123* (2013.01)

(58) Field of Classification Search

CPC ... H04L 45/22; H04L 45/123; H04L 61/2567; H04L 2012/6432; H04L 41/122; H04L 45/76; H04L 41/0806

See application file for complete search history.

(56) References Cited

U.S. PATENT DOCUMENTS

| | | | |
|---|---|---|---|
| 7,447,901 | B1 | 11/2008 | Sullenberger et al. |
| 7,848,335 | B1 | 12/2010 | Kang et al. |

(Continued)

OTHER PUBLICATIONS

C. Kaufman et al., Internet Key Exchange Protocol Version 2 (IKEv2), Standards Track, Oct. 14, 2014, RFC 7296, 142 pages.

(Continued)

*Primary Examiner* — Schquita D Goodwin
*Assistant Examiner* — Linh T. Nguyen
(74) *Attorney, Agent, or Firm* — Law Office of Dorian Cartwright; Dorian Cartwright

(57) ABSTRACT

An outbound packet is detected from a client device of a first spoke destined to a client device of a second spoke over SD-WAN through a hub connecting the first and second spokes with IPSec tunneling. The first spoke is on a local enterprise network, the second spoke is on a remote enterprise network and the hub is on wide area network, and each of the first spoke, the second spoke and the hub are each ADVPN2.0 compatible. Responsive to the detection, a health check is performed on the remote spoke. A path is selected between a local NAT device of multiple NAT devices of the first spoke and a remote NAT device of the multiple remote NAT devices of the second spoke, based on link quality data of the response. A NAT hole is punched between a selected local NAT and a selected inbound NAT and an IPSec tunnel is established, independent of the hub.

10 Claims, 6 Drawing Sheets

(51) Int. Cl.
*H04L 41/0806* (2022.01)
*H04L 45/12* (2022.01)

(56) References Cited

U.S. PATENT DOCUMENTS

| | | | |
|---|---|---|---|
| 11,329,883 | B2 | 5/2022 | Zhang |
| 11,451,484 | B2 | 9/2022 | Bajaj |
| 11,824,754 | B2 | 11/2023 | Magnezi et al. |
| 2003/0177221 | A1 | 9/2003 | Ould-Brahim et al. |
| 2011/0004913 | A1 | 1/2011 | Nagarajan et al. |
| 2014/0380460 | A1 | 12/2014 | Bhalerao et al. |
| 2016/0182444 | A1* | 6/2016 | Mao .................... H04L 61/2514 370/392 |
| 2016/0261506 | A1 | 9/2016 | Hegde et al. |
| 2017/0230199 | A1 | 8/2017 | Shen et al. |
| 2019/0052658 | A1 | 2/2019 | Clarke et al. |
| 2019/0140955 | A1 | 5/2019 | Hemige et al. |
| 2020/0252234 | A1* | 8/2020 | Ramamoorthi ..... H04L 12/2859 |
| 2020/0336464 | A1 | 10/2020 | Hastings |
| 2021/0036887 | A1 | 2/2021 | Meng et al. |
| 2021/0067442 | A1 | 3/2021 | Sundararajan et al. |
| 2021/0168125 | A1 | 6/2021 | Vemulpali |
| 2021/0288881 | A1* | 9/2021 | Zhang ................. H04L 12/4633 |
| 2021/0306247 | A1 | 9/2021 | Duan |
| 2021/0352151 | A1 | 11/2021 | Gupta et al. |
| 2022/0029857 | A1* | 1/2022 | Ponnuru ............. H04L 12/4633 |
| 2023/0029882 | A1 | 2/2023 | Hooda et al. |
| 2023/0059537 | A1 | 2/2023 | Gavand et al. |
| 2023/0116163 | A1* | 4/2023 | Scholz ................ H04L 61/2567 370/392 |
| 2023/0216733 | A1 | 7/2023 | Bevan et al. |
| 2024/0015529 | A1 | 1/2024 | Xu |
| 2024/0291760 | A1 | 8/2024 | Duan et al. |

OTHER PUBLICATIONS

F. Audet, ED. et al., Network Address Translation (NAT) Behavioral Requirements for Unicast UDP, Best Current Practice, Audet & Jennings, Jan. 2007, 29 pages.

* cited by examiner

NETWORK ADDRESS TRANSLATION (NAT) HOLE PUNCHING OVER SOFTWARE-DEFINED WIDE AREA NETWORKING (SD-WAN) FOR LINK QUALITY SELECTION OF VIRTUAL PRIVATE NETWORKING (VPN) TUNNELS

CROSS-REFERENCE TO RELATED APPLICATIONS

The present patent application claims priority, as a continuation-in-part, under 35 U.S.C. 120 to commonly-owned U.S. application Ser. No. 17/566,801, filed Dec. 31, 2021, the contents of which are hereby incorporated in its entirety.

FIELD OF THE INVENTION

The invention relates generally to computer networks, and more specifically, to Network Address Transaction (NAT) hole punch over Software-Defined Wide Area Networking (SD-WAN) to allow link quality selection for Virtual Private Networking (VPN) tunnels.

BACKGROUND

Enterprise networks that are geographically distributed from each other can take advantage of SD-WAN. This technology provides secure VPN tunnels between offices of, for example, San Francisco and Chicago. As a result, secure data and resources can be shared.

In order to allude malicious actors from targeted attacks, some network devices use proxy servers armed with IP masking techniques to hide real IP addresses from abuse. Under the conventional Auto Discovery VPN (ADVPN) 1.0, construction of a secure VPN tunnel between endpoints, provided penetration to network devices protected with masking.

The advent of ADVPN 2.0 allows flexibility in communication paths between endpoints, without providing a mechanism to do so in lieu of multiple masking servers. However, when implemented within multiple NAT devices topology, ADVPN 1.0 unique external IP address and port could be efficiently relayed via the ADVPN protocol, made possible by the capture of this information as protocol messages traversed the hub. With ADVPN 2.0, this approach is rendered ineffective as the protocol messages might not transit through the optimized NAT device, thus impeding the remote spoke's ability to broadcast multiple external IP addresses and ports.

Therefore, what is needed is a robust technique for NAT hole punching over SD-WAN, independent of central management, to allow link quality selection for an optimal path between multiple NAT devices for VPN tunnels.

SUMMARY

To meet the above-described needs, methods, computer program products, and systems for NAT hole punching over SD-WAN to allow link quality selection for VPN tunnels.

In one embodiment, an outbound packet is detected from a client device of a first spoke destined to a client device of a second spoke over SD-WAN through a hub connecting the first and second spokes with IPSec tunneling. The first spoke is on a local enterprise network, the second spoke is on a remote enterprise network and the hub is on wide area network, and each of the first spoke, the second spoke and the hub are each ADVPN2.0 compatible.

In another embodiment, responsive to the detection, an offer is received at the first spoke from the hub, including an IP address of the second spoke. The second spoke is queried, from the first spoke through the hub, with a health check for link quality information for a plurality of links. The link quality concerns multiple remote NAT devices of the second spoke. A response from the second spoke can be received, at the first spoke through the hub, wherein the response includes multiple external IP addresses with ports and link quality data for the multiple remote NAT devices.

In still another embodiment, a path is selected between a local NAT device of multiple NAT devices of the first spoke and a remote NAT device of the multiple remote NAT devices of the second spoke, based on link quality data of the response. An update message is transmitted, from the first spoke through the hub to the second spoke. The update message includes the selected inbound and outbound NAT devices. A NAT hole is punched between a selected local NAT and a selected inbound NAT and an IPSec tunnel is established, independent of the hub; and The outgoing packet is then transmitted from the client device of the first spoke over the IPSEC tunnel to the client device of the second spoke.

Advantageously, network and network device performance are improved with better network security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for NAT hole punching over SD-WAN to allow link quality selection for VPN tunnels. The following disclosure is limited only for the purpose of conciseness, as one of ordinary skill in the art will recognize additional embodiments given the ones described herein.

I. Systems for NAT Hole Punching (FIGS. 1-3)

Figure 1:
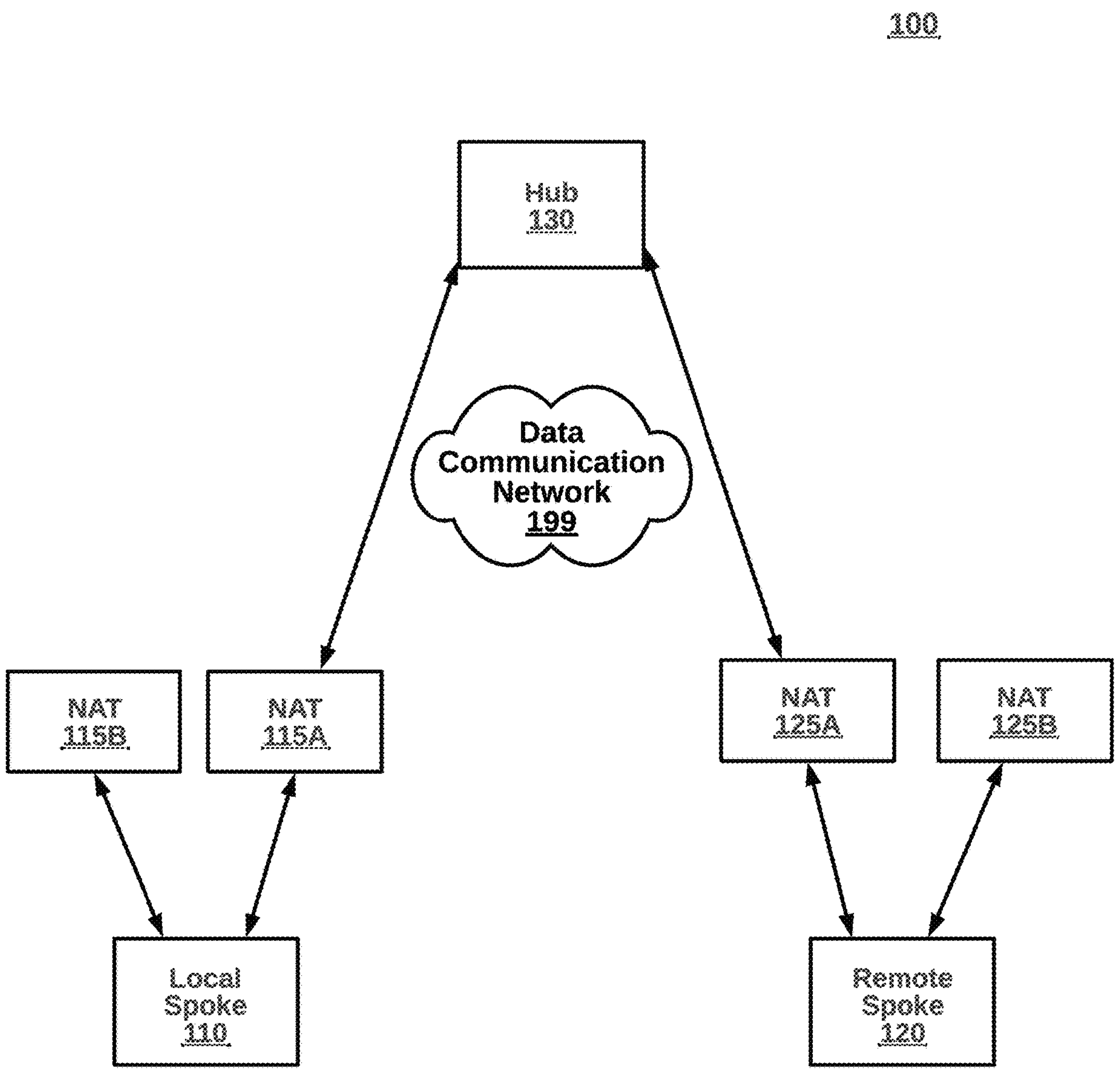
FIG. 1 is a high-level block diagram illustrating aspects of a system for NAT hole punching over SD-WAN to allow link quality selection for VPN tunnels, according to some embodiments.
Figure 2:
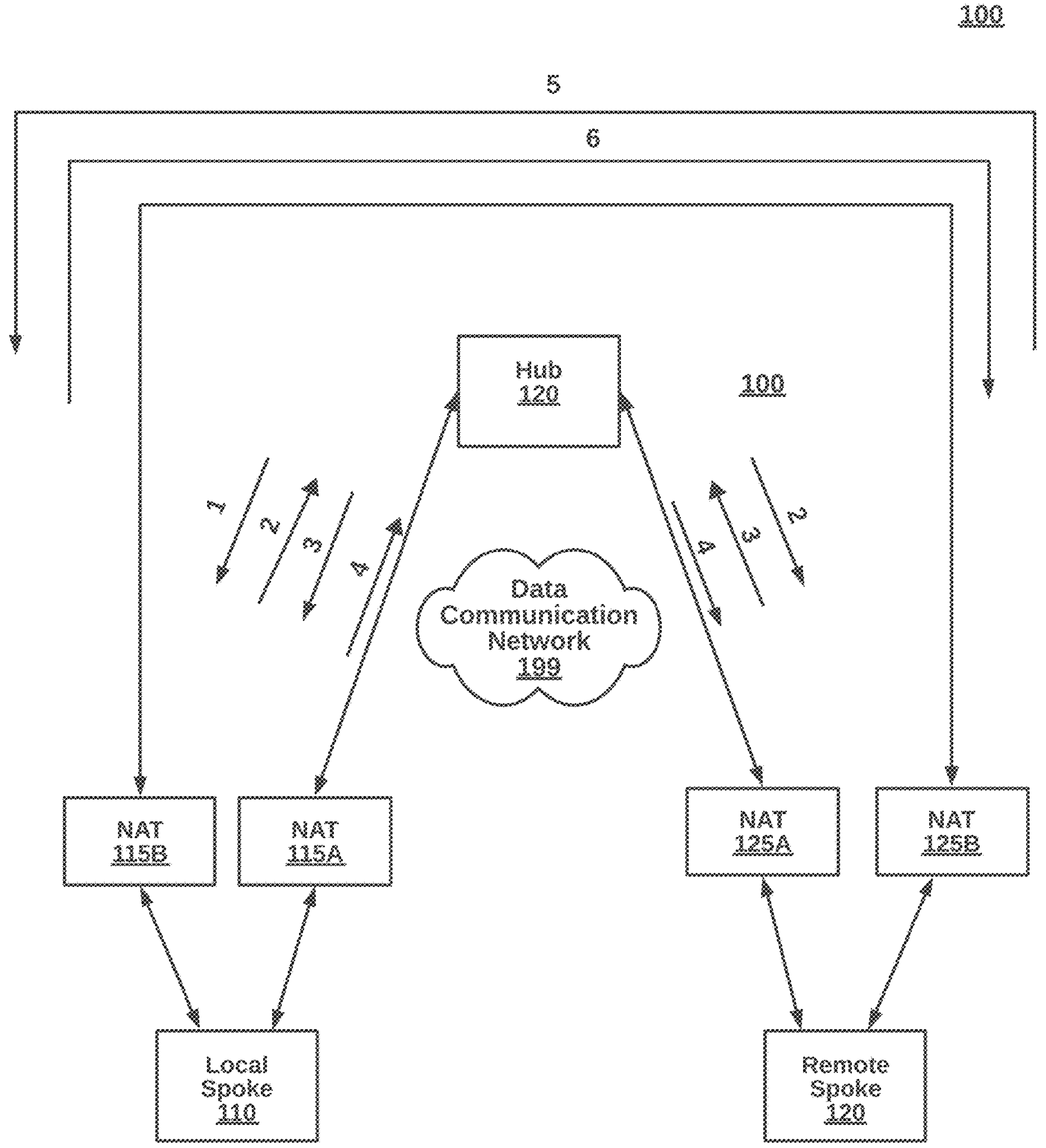
FIG. 2 is a sequence diagram illustrating interactions between components of the system of FIG. 1, according to an embodiment.
Figure 6:
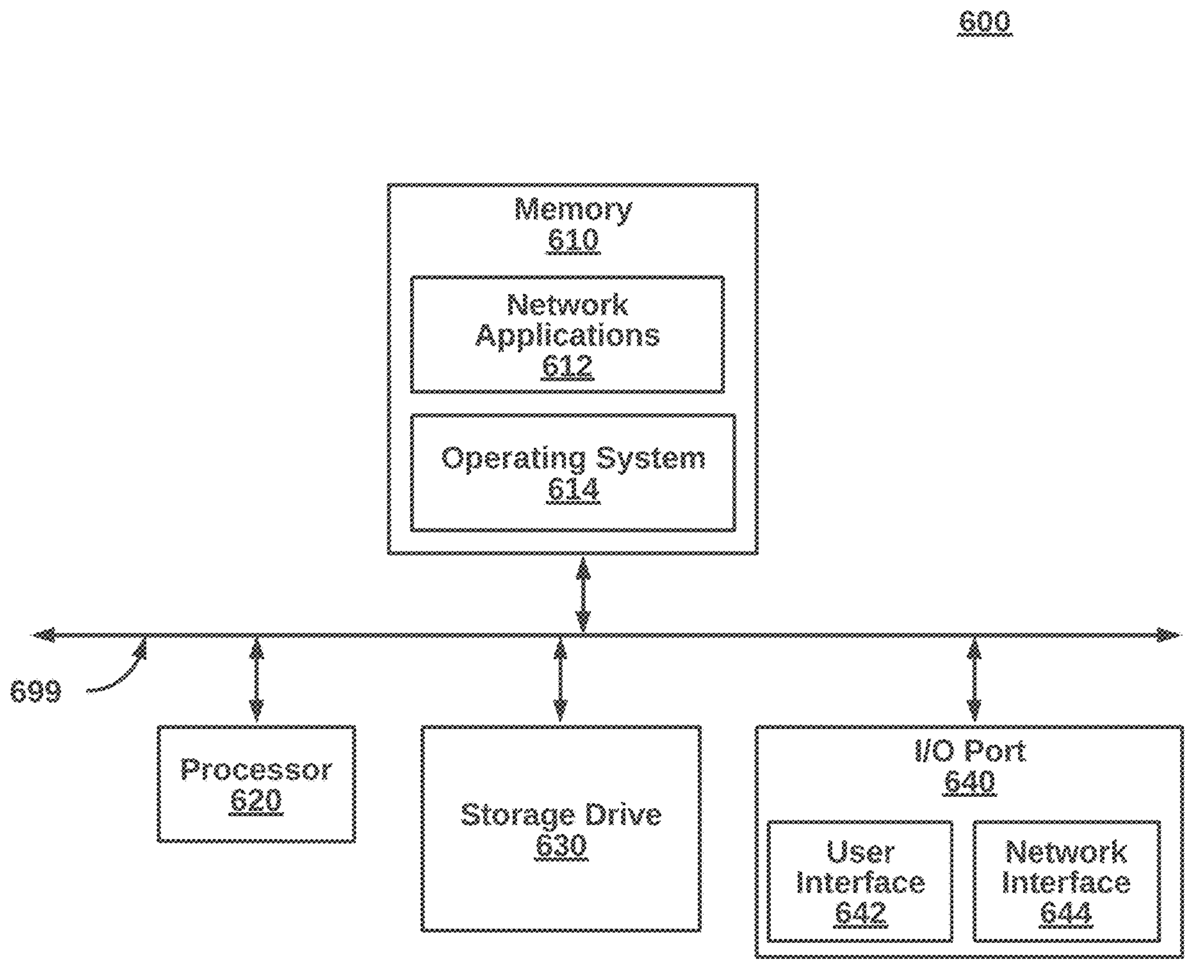
FIG. 6 is a block diagram illustrating an example computing device for the system of FIG. 1, according to an embodiment.

FIG. 1 is a high-level block diagram illustrating a system 100 for NAT hole punching over SD-WAN to allow link quality selection for VPN tunnels, according to an embodiment. The system 100 includes a local spoke 110 on a first LAN, a remote spoke 120 on a second LAN, and hub 130 on a WAN. In an example, the first LAN can be a San Francisco office, the second LAN can be a Chicago office, and the WAN can be the Internet. The local spoke 110 is behind the NATs 115A and 115B and the remote spoke 120 is behind the NATs 125A and 125B. Other embodiments of the system 100 can include additional components that are not shown in FIG. 1, such as additional servers and gateways, along with Wi-Fi controllers, access points, routers and switches. There can also be additional NATs, spokes and hubs in other implementations. The components of system 100 can be implemented in hardware, software, or a combination of both. An example implementation of processor-based hardware components is shown in FIG. 6.

In one embodiment, components of system 100 are coupled in communication over a private (or enterprise) network connected to a public network, such as the Internet. In another embodiment, system 100 is an isolated, private network, or alternatively, a set of geographically dispersed LANs. The components can be connected to the data communication system via hard wire (e.g., local spoke 110, remote spoke 120, hub 130 and user devices 140 and 150). The components can also be connected via wireless networking (e.g., wireless stations and mesh networking nodes). The data communication network can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPV4 or Ipv6 address spaces.

In the embodiment of FIG. 1, an existing VPN tunnel between local spoke 110 and remote spoke 120 enables communication between NAT servers 125A and 135A. In turn, user devices 140 and 150 were able to conduct secure communications, under ADVPN 1.0. A choice of NAT servers that also includes NAT servers 125B and 135B is available under ADVPN 2.0. In order to select an optimal path, a health check is conducted on a remote LAN. If the optimal NAT path does not include an existing VPN tunnel, a NAT hole is punched for building a new secure VPN tunnel between the NAT servers, such as NAT server 125B and 135B. The data path is independent of hub 130. In one embodiment, the local spoke 120 tracks sessions separately between those sessions traveling through the hub 130 and those sessions traveling independent of hub 130.

FIG. 2 shows an example of interactions between the components implementing NAT hole punching, outside of the hub 130. As explained in more detail below, there are six message exchanges for construction of a NAT hole punch: 1. Offer message, 2. Query message, 3. Response message, 4. Update message, 5. UDP session packet and 6. Negotiation message. A cache table stores all external IP addresses and ports associated with IPSec endpoints of an internal spoke situated behind NAT devices. The caching mechanism acquires external IP and port information from a source IP of a negotiation packet. Subsequently, this information is related back to the internal spoke within a payload of an IPSec notify message. To facilitate this process, the notify message incorporates three specific data types: IKEV2_ADVPN EXT IP4, IKEV2 ADVPN EXT IP4, and IKEV2 ADVPN EXT PORT. Upon receipt of this data, the spoke stores them within the cache of the IPSec endpoint objects. Given that ADVPN facilitates the dynamic establishment of VPN tunnels in initiation of user traffic, it is crucial that the cache table is built prior to the onset of traffic flow, during the setup phase of an IPSec endpoint.

NAT hole punching is pivotal because it establishes a session uniquely tailored for the negotiation packet from the peer spoke, enabling it to reach the internal spoke through this designated session, which is known as a NAT hole. Under ADVPN 2.0, an update message to remote spoke 120 through the IPSec endpoints located at NAT devices 115A and 125A. Upon receiving the update message, remote spoke 120 discerns that the path has been set via NAT devices 115B and 125B. Consequently, a UDP session packet is dispatched from NAT 125B to NAT 115B. The external IP address and port of NAT 115B are cached and forwarded to remote spoke 120 within the update message payload. As the UDP session packet traverses NAT device 125B, its source IP address and port are transformed to the external IP and port of NAT device 125B, while its destination remains unchanged. Concurrently, a session is established within the NAT device 125B, identifying the NAT device 125B external IP address as the source and the NAT device 115B external IP address as the destination. Following the dispatch of the update message from local spoke 110, a negotiation packet is sent towards NAT device 125B via NAT device 115B. The packet's original source IP address and port are altered to the external IP address and port of NAT device 115B, targeting NAT device 125B external IP address and port. Upon arrival at NAT device 125B, the negotiation packet is permitted to pass and be forwarded to remote spoke 120, contingent on the prior creation of a UDP session. Should the UDP session not be established, the packet is dropped. However, the packet is destined to eventually reach remote spoke 120, assuming the UDP session is established, due to the mechanism that retransmits the negotiation packet in absence of a response.

More generally, the local spoke 110 and remote spoke 120, connect user devices 140,150 for communication through hub 130, using a VPN tunnel secured with IPSec. Border Gateway Protocol (BGP) can provide routing over IPSec. A heartbeat, or other mechanism, can keep the VPN tunnel active and avoid being torn down during idle times. In one implementation, local spoke 110 is integrated into a gateway device. In another implementation, local spoke 110 is integrated into a gateway device that also executes NAT services. Conventional systems rely upon the hub 130 for Internet Key Exchange (IKE) shortcut messages and policy routes. Edge management and path discovery allows path discovery to be performed at spokes, independent of the hub. Once an initial VPN tunnel is established, many additional ones can be constructed outside of the hob 130. In some embodiments, spokes can inform the hub of external routes. Spokes can communicate with each other on a control plane using, for example, an ADVPN shortcut.

The NAT servers 125A-B, 135A-B mask device IP addresses for VPN (and other) communications. In this proxy network architecture, direct access to network components is prevented by mapping a public IP address to a private IP address that is not known to outsiders. Attacks against network devices are thus first passed through the NAT servers 125A-B, 135A-B, as an additional layer of protection. In one case, an IP address table maps known IP addresses received by a front end and unknown IP addresses used for direct communication with network devices on a back end. IP addresses can be dedicated, static or dynamic.

In some cases, external devices cannot initiate a connection to a protected device, only internally initiated communications will allow responses.

The spokes 110, 120 and NAT servers 125A-B, 135A-B, can be a single device, or can be distributed among cooperating devices. In another embodiment, a third-party server provides offloading support from the Internet to these LAN-based devices. The NAT servers 125A-B, 135A-B can be a router, a NAT firewall device, or a gateway device, for example. The devices can include a Command Line Interface (CLI) or a Graphical User Interface (GUI) for configuration by a user or a network administrator through a wired port or a wireless access. The technique herein can be implemented directly into a new operating system from the ground up, or update an existing operating system with a software patch or upgrade.

Figure 3A:
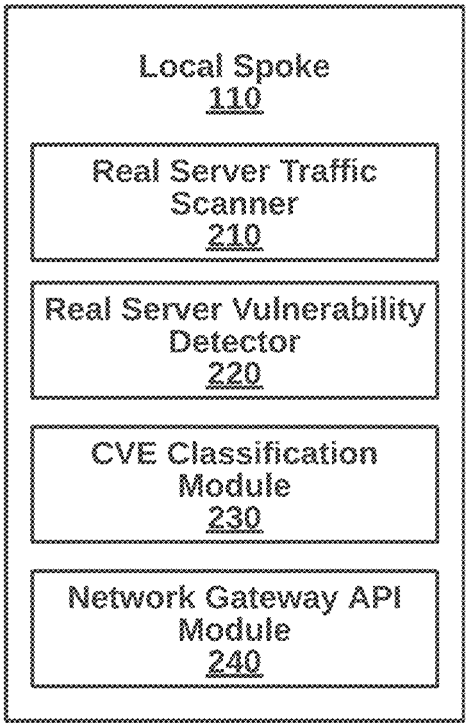
FIG. 3A is a more detailed block diagram illustrating a spoke device of the system of FIG. 1, according to an embodiment.

FIG. 3A is a more detailed view of the spoke device 110 of FIG. 1, according to an embodiment. The spoke device 110 further includes a VPN session module 310, a health check module 320 an optimal VPN path module 330 and a NAT hole punching module 340. The components of the spoke device 110 can be implemented in software, hardware, or a combination of both. Many other variations are possible.

The VPN session module 210 detects an outbound packet from a client device of a first spoke destined to a client device of a second spoke over SD-WAN through a hub connecting the first and second spokes with IPSec tunneling. The first spoke is on a local enterprise network. The second spoke is on a remote enterprise network and the hub is on wide area network. Each of the first spoke, the second spoke and the hub are each ADVPN2.0 compatible.

The health check module 320, responsive to the detection, can initiate an intelligent process of edge discovery and path management between spokes. To start, an offer is received at the first spoke from the hub, including an IP address of the second spoke. The health check module 220 queries the second spoke, from the first spoke through the hub, with a health check for link quality information for a plurality of links. The link quality concerns multiple remote NAT devices of the second spoke. A response is received from the second spoke, at the first spoke through the hub. The response includes multiple external IP addresses with ports and link quality data for the multiple remote NAT devices. In some embodiment, health checks are periodically updated, resulting in updated path selections.

The optimal VPN path module 330, in an embodiment, selects a path between a local NAT device of multiple NAT devices of the first spoke and a remote NAT device of the multiple remote NAT devices of the second spoke, based on link quality data of the response. In some implementations, machine learning or artificial intelligence predicts the best path. In other implementation, probability-based models predict the best path. The optimal VPN path module 230 can transmit an update message, from the first spoke through the hub to the second spoke. The update message includes the selected inbound and outbound NAT devices.

The NAT hole punching module 340 punches a hole between a selected local NAT and a selected inbound NAT and an IPSec tunnel is established, independent of the hub. The NATs can conduct several IPSec sessions at the same time. In one embodiment, NAT hole punching is initiated with a UDP packet to establish a UDP session. Next, a negotiation is initiated for a second IPSec tunnel, by sending a negotiation packet from the selected remote NAT device of the second spoke to the selected local NAT device of the first spike. Then, the second IPSec tunnel is established between the first spoke and the second poke, without passing through the hub.

The VPN tunnel module 350 transmits the outgoing packet from the client device of the first spoke over the VPN tunnel to the client device of the second spoke.

Figure 3B:
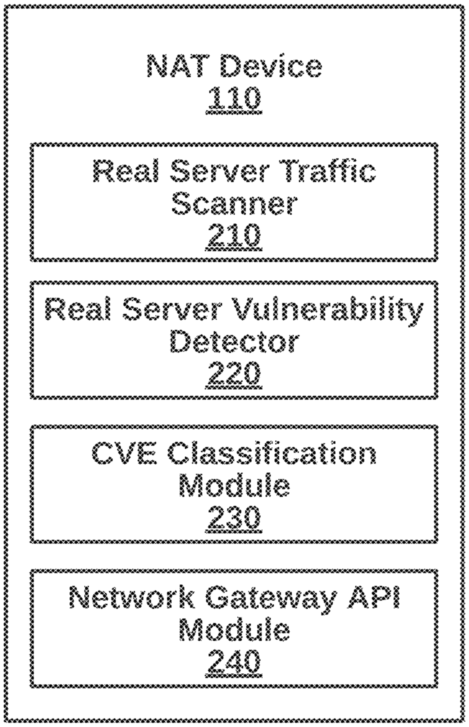
FIG. 3B is a more detailed block diagram illustrating a NAT device of the system of FIG. 1, according to an embodiment.

FIG. 3B is a more detailed view of the local NAT device 115A of FIG. 1, according to an embodiment. The other NAT devices can be the same or have modifications. The NAT device 120 further includes an address translation table 315, a VPN tunnel module 325, an optimal VPN path module 335 and a NAT hole module 340. The components of the spoke device 110 can be implemented in software, hardware, or a combination of both. Many other variations are possible.

There are numerous variations to those that are listed herein, that would be apparent to one of ordinary skill in the art, given the disclosure herein.

II. Methods for NAT Hole Punching (FIGS. 4-5)

Figure 4:
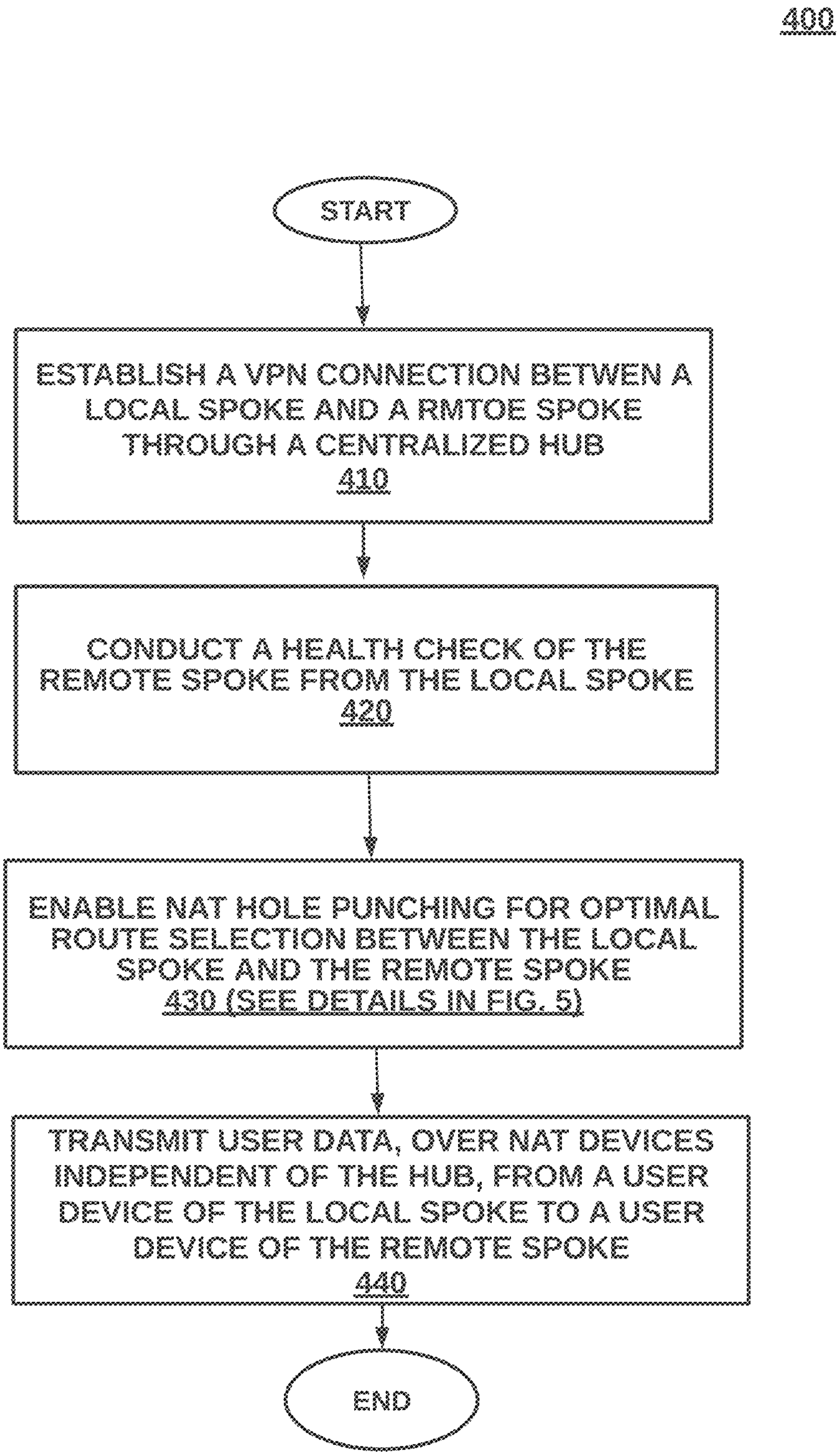
FIG. 4 is a high-level flow diagram of a method for providing VPN tunnels between spokes, according to an embodiment.

FIG. 4 is a high-level flow diagram of a method 400 for NAT hole punching over SD-WAN to allow link quality selection for VPN tunnels, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, a VPN connection is established between a local spoke and a remote spoke (i.e., a first VPN between local spoke and hub; and a second VPN between hub and remote spoke), through a first NAT device and a second NAT device, to connect a first LAN securely to a second LAN. At step 420, a health check of the remote spoke is conducted from the local spoke. A local health check can also be conducted. At step 430, NAT hole punching is enabled for optimal route selection between the local spoke and the remote spoke, independent of the hub. In some implementations, NAT hole punching can be manually or automatically enabled and disabled, based on a variety implementation-specific conditions. For example, a load balancing algorithm can bring additional NAT devices online due to various network conditions, such as during heavy traffic periods, and retire NAT devices during light traffic periods.

Figure 5:
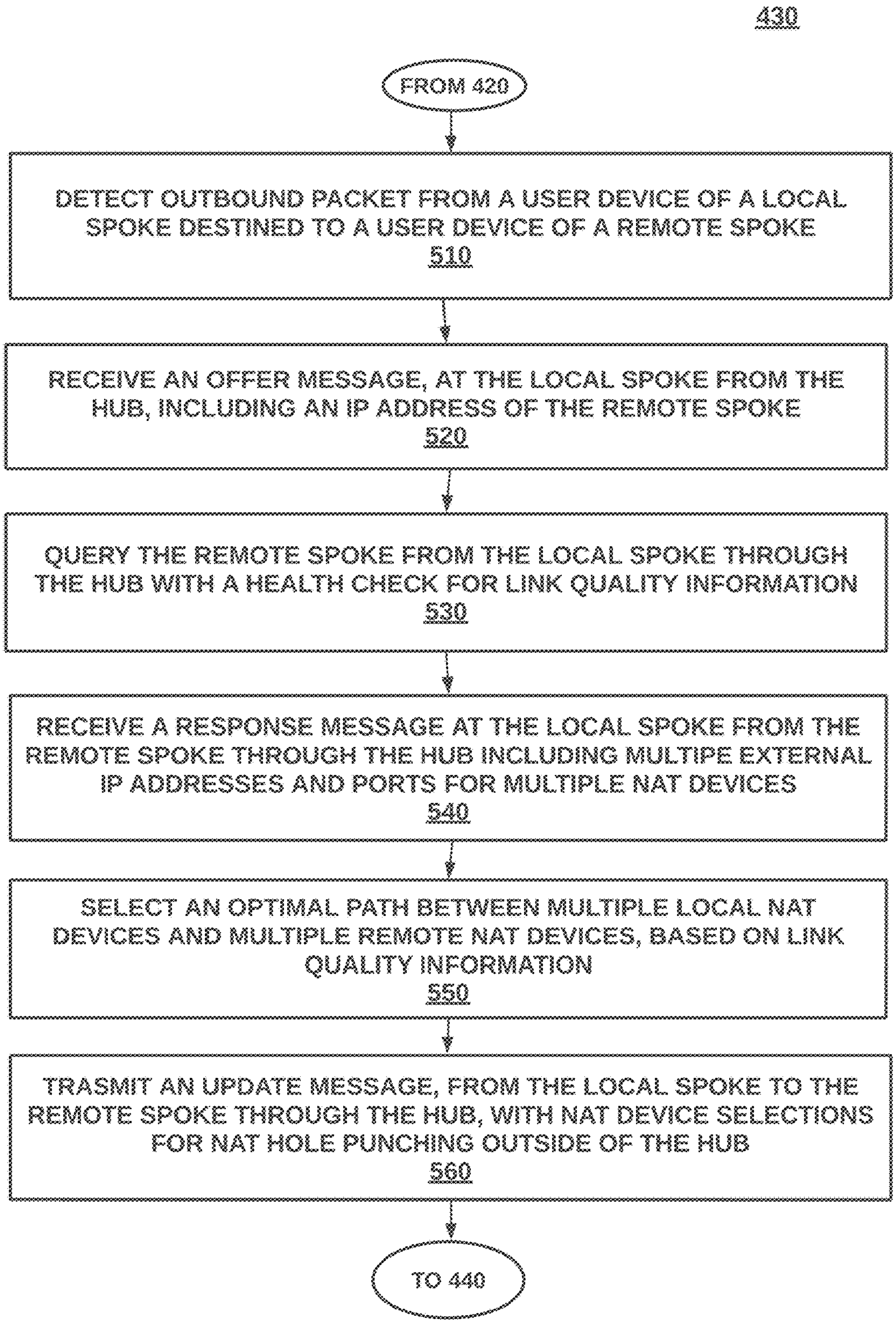
FIG. 5 is a more detailed flow diagram of a step of NAT hole punching, from the method of FIG. 4, according to an embodiment.

An example of the step 430 of NAT hole punching is set forth in in FIG. 5. At step 510, an outbound packet is detected from a client device of a first spoke destined to a client device of a second spoke over SD-WAN through a hub connecting the first and second spokes with IPSec tunneling. The first spoke is on a local enterprise network, the second spoke is on a remote enterprise network and the hub is on wide area network, and each of the first spoke, the second spoke and the hub are each ADVPN 2.0 compatible.

At step 520, responsive to the detection, an offer is received, at the first spoke from the hub, including an IP address of the second spoke.

At step 530, the second spoke is queried, from the first spoke through the hub, with a health check for link quality information for a plurality of links. The link quality concerns multiple remote NAT devices of the second spoke.

At step 540, a response message is received from the second spoke, at the first spoke through the hub. The response includes multiple external IP addresses with ports and link quality data for multiple remote NAT devices. In some embodiments, local NAT device external IP addresses and ports and link quality information is gathered.

At step 550, an optimal path is selected between multiple local NAT devices of the first spoke and multiple remote NAT devices of the second spoke, based on link quality information of the response. In other embodiments, link quality of local and remote NAT devices is considered in selections. Artificial intelligence or other techniques can leverage historical local data, or Internet data, in selections.

At step 560, an update message is transmitted, from the first spoke through the hub to the second spoke. The update message includes the selected inbound and outbound NAT devices. A NAT hole is punched between a selected local NAT and a selected inbound NAT and an IPSec tunnel is established, independent of the hub. More than one NAT hole is possible on a single device. It is also possible to NAT hole punch through multiple NAT devices, or other types of proxies.

At step 570, the outgoing packet is transmitted, from the client device of the first spoke over the IPSec tunnel to the client device of the second spoke.

III. Computing Device for NAT Hole Punching (FIG. 6)

FIG. 6 is a block diagram illustrating a computing device 600, for use in the system 100 of FIG. 1 in automatic virtual patching, according to one embodiment. The computing device 600 is a non-limiting example device for implementing each of the components of the system 100, including local spoke 110, remote spoke 120, hub 130, NAT devices 125A-B, 135A0B, and clients 140, 150. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., FortiOS, Windows 98, 98, Me, Windows NT, Windows 2000, Windows XP, Windows XP x84 Edition, Windows Vista, Windows CE, Windows Mobile, Windows 7, Windows 8 or Windows 10), Linux, HP-UX, UNIX, Sun OS, Solaris, Mac OS X, Alpha OS, AIX, IRIX32, or IRIX84. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL and FORTIPHISH families of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use.

The scope of the invention is defined by the following claims.

We claim:

1. A computer-implemented method in a network device for Network Address Translation (NAT) hole punching over Software-Defined Wide Area Networking (SD-WAN) to allow link quality selection for Virtual Private Networking (VPN) tunnel, the method comprising:

detecting an outbound packet from a client device of a first spoke destined to a client device of a second spoke over SD-WAN through a hub connecting the first and second spokes with Internet Protocol Security (IPsec) tunneling, wherein the first spoke is on a local enterprise network, the second spoke is on a remote enterprise network and the hub is on wide area network, and each of the first spoke, the second spoke and the hub are each Auto Discovery Virtual Private Networking 2.0 (ADVPN2.0) compatible;

responsive to the detection, receiving an offer at the first spoke from the hub, including an IP address of the second spoke;

querying the second spoke, from the first spoke through the hub, with a health check for link quality information for a plurality of links, wherein the link quality concerns multiple remote NAT devices of the second spoke;

receiving a response from the second spoke, at the first spoke through the hub, wherein the response includes multiple external IP addresses with ports and link quality data for the multiple remote NAT devices;

selecting a path between a local NAT device of multiple NAT devices of the first spoke and a remote NAT device of the multiple remote NAT devices of the second spoke, based on link quality data of the response;

transmitting an update message, from the first spoke through the hub to the second spoke, wherein the update message includes the selected inbound and outbound NAT devices, wherein a NAT hole is punched between a selected local NAT and a selected remote NAT and an IPSec tunnel is established, independent of the hub; and transmitting the outgoing packet from the client device of the first spoke, over the IPSec tunnel between the selected local NAT and the selected remote NAT, to the client device of the second spoke.

2. The method of claim 1, wherein the network device comprises the first spoke.

3. The method of claim 1, wherein the NAT hole is punched by:

sending a UDP session packet from the selected remote NAT device of the second spoke to the selected local NAT device of the first spoke, to establish a UDP session;

initiating a negotiation for a second IPSec tunnel, by sending a negotiation packet from the selected remote NAT device of the second spoke to the selected local NAT device of the first spike; and establishing the second IPSec tunnel between the first spoke and the second poke, without passing through the hub.

4. The method of claim 1, wherein the local NAT device punches a second NAT hole to a second remote NAT device.

5. The method of claim 1, wherein the network device comprises a network gateway device.

6. The method of claim 1, wherein network device comprises a router device.

7. The method of claim 1, wherein the NAT hole is punched between the selected local NAT and the selected remote NAT and the IPSec tunnel is established, independent of the hub, by sending a UDP frame from the selected remote NAT to the selected local NAT to start a UDP session.

8. The method of claim 1, wherein the network device is ADVPN 2.0 compatible.

9. A non-transitory computer-readable medium in a network device, on a data communication network, for Network Address Translation (NAT) hole punching over Software-Defined Wide Area Networking (SD-WAN) to allow link quality selection for Virtual Private Networking (VPN) tunnel, the method comprising:

detecting an outbound packet from a client device of a first spoke destined to a client device of a second spoke over SD-WAN through a hub connecting the first and second spokes with Internet Protocol Security (IPSec) tunneling, wherein the first spoke is on a local enterprise network, the second spoke is on a remote enterprise network and the hub is on wide area network, and each of the first spoke, the second spoke and the hub are each Auto Discovery Virtual Private Networking 2.0 (ADVPN2.0) compatible;

responsive to the detection, receiving an offer at the first spoke from the hub, including an IP address of the second spoke;

querying the second spoke, from the first spoke through the hub, with a health check for link quality information for a plurality of links, wherein the link quality concerns multiple remote NAT devices of the second spoke;

receiving a response from the second spoke, at the first spoke through the hub, wherein the response includes multiple external IP addresses with ports and link quality data for the multiple remote NAT devices;

selecting a path between a local NAT device of multiple NAT devices of the first spoke and a remote NAT device of the multiple remote NAT devices of the second spoke, based on link quality data of the response;

transmitting an update message, from the first spoke through the hub to the second spoke, wherein the update message includes the selected inbound and outbound NAT devices, wherein a NAT hole is punched between a selected local NAT and a selected inbound NAT and an IPSec tunnel is established, independent of the hub; and transmitting the outgoing packet from the client device of the first spoke, over the IPSec tunnel between the selected local NAT and the selected remote NAT, to the client device of the second spoke.

10. A network device for Network Address Translation (NAT) hole punching over Software-Defined Wide Area Networking (SD-WAN) to allow link quality selection for Virtual Private Networking (VPN) tunnel, the network device comprising:

a processor;

a network interface communicatively coupled to the processor and to a data communication network; and a memory, communicatively coupled to the processor and storing:

a VPN session module to detect an outbound packet from a client device of a first spoke destined to a client device of a second spoke over SD-WAN through a hub connecting the first and second spokes with Internet Protocol Security (IPSec) tunneling, wherein the first spoke is on a local enterprise network, the second spoke is on a remote enterprise network and the hub is on wide area network, and each of the first spoke, the second spoke and the hub are each Auto Discovery Virtual Private Networking 2.0 (ADVPN2.0) compatible;

an optimal VPN tunnel path to, responsive to the detection, receive an offer at the first spoke from the hub, including an IP address of the second spoke, wherein the optimal VPN path module queries the second spoke, from the first spoke through the hub, with a health check for link quality information for a plurality of links, wherein the link quality concerns multiple remote NAT devices of the second spoke, wherein the optimal VPN path module receives a response from the second spoke, at the first spoke through the hub, wherein the response includes multiple external IP addresses with ports and link quality data for the multiple remote NAT devices, and wherein the optimal VPN tunnel module selects a path between a local NAT device of multiple NAT devices of the first spoke and a remote NAT device of the multiple remote NAT devices of the second spoke, based on link quality data of the response;

a VPN tunnel module to transmit an update message, from the first spoke through the hub to the second spoke, wherein the update message includes the selected inbound and outbound NAT devices, wherein a NAT hole is punched between a selected local NAT and a selected inbound NAT and an IPSec tunnel is established, independent of the hub; and a VPN tunnel module to transmit the outgoing packet from the client device of the first spoke, over the IPSec tunnel between the selected local NAT and the selected remote NAT, to the client device of the second spoke.

* * * * *